United States Patent
Soma et al.

(10) Patent No.: US 6,819,636 B1
(45) Date of Patent: Nov. 16, 2004

(54) OPTICAL DISC DEVICE

(75) Inventors: Yasuhito Soma, Hirakata (JP);
Kazuhiko Kouno, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/700,709

(22) PCT Filed: May 27, 1999

(86) PCT No.: PCT/JP99/02790

§ 371 (c)(1),
(2), (4) Date: Nov. 24, 2000

(87) PCT Pub. No.: WO99/62062

PCT Pub. Date: Dec. 2, 1999

(30) Foreign Application Priority Data

May 27, 1998 (JP) .......................................... 10-145923

(51) Int. Cl.[7] .............................. G11B 7/00; G11B 7/085
(52) U.S. Cl. ................................ 369/44.11; 369/44.29; 369/44.35; 369/59.15; 369/53.28
(58) Field of Search .......................... 369/44.11, 44.32, 369/44.28, 44.29, 53.14, 30.15, 44.13, 44.34, 53.18, 53.28, 44.25, 44.35, 59.15

(56) References Cited

U.S. PATENT DOCUMENTS 5,396,477 A  *  3/1995  Matsumoto et al. ..... 369/44.28
5,532,990 A  *  7/1996  Koyama et al. ......... 369/44.32
6,266,304 B1 *  7/2001  Nagano et al. .......... 369/44.32

FOREIGN PATENT DOCUMENTS

| CN | 1129992 A | 8/1996 |
| JP | 61260428 | 11/1986 |
| JP | 9-274726 | 10/1997 |
| JP | 10233020 | 9/1998 |

OTHER PUBLICATIONS

English Language abstract of JP–10–233020.
English Language abstract of JP–61–260428.
English Language abstract of JP–9–274726.
English Language Abstract of WO 95/31806.

* cited by examiner

Primary Examiner—William Korzuch
Assistant Examiner—Kim-Kwok Chu
(74) Attorney, Agent, or Firm—Greenblum & Bernstein, P.L.C.

(57) ABSTRACT

In an optical disc device that selectively implements a tracking servo and a spot position servo, a discontinuation cancellation unit is provided so that, when switching from the tracking servo to the spot position servo, and when switching in the opposite direction, the low-frequency component of the tracking drive signal and the low-frequency component of the spot position servo connect smoothly so that there is no step difference.

10 Claims, 11 Drawing Sheets

Fig.4
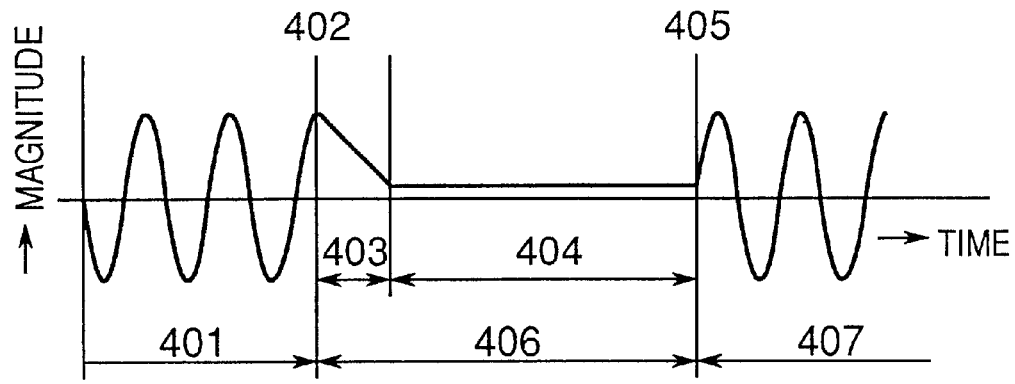
Fig.5
(A)
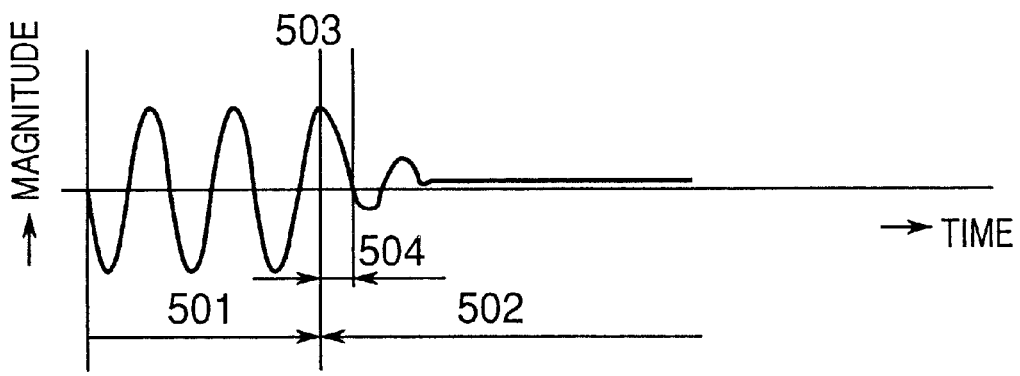
(B)
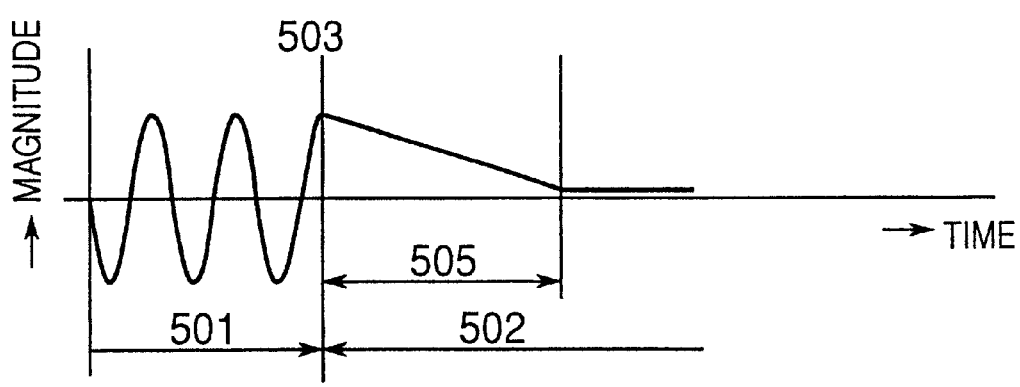

(A) COEFFICIENT IN MULTIPLIER 902

(B) LOW-RANGE COMPONENT IN DRIVE SIGNAL SUPPLIED TO TRACKING ACTUATOR 104

$T_{ofs} = K \cdot L_p$

OPTICAL DISC DEVICE

TECHNICAL FIELD

This invention relates to an optical disc device for recording information to or playing back information from an optical disc having concentric or spiral information tracks.

BACKGROUND ART

In recent years, optical disc devices are being developed for recording information to or playing back information from optical discs such as CDs (compact discs) or MDs (mini discs) that have concentric or spiral information tracks. The basic configuration of these optical disc devices is such that information tracks are tracked with a light spot generated by condensing a light beam emitted by a laser diode or the like with an objective lens and the information is recorded or played back. For this reason, in optical disc devices, the so-called tracking servo is a mandatory element. The tracking servo generates a tracking error signal that by some means or other indicates the positional discrepancy between an information track and the light spot, and moves the light spot until that signal becomes zero.

Various methods have been proposed as a method for generating the tracking error signal. One of those methods is the push-pull method which uses a divided light reception element. On the plus side, this method features a simple configuration, so that manufacturing costs are low, and, as compared to the three beam method, etc., it is not necessary to have a long light path length, so that the size can be made smaller. On the minus side, a direct current offset appears in the tracking error signal according to the position of the light spot on the light receiving element, which constitutes a shortcoming.

Recently, proposals have been made to implement a servo wherein the direct current offset is used as a spot position signal indicating the position of the light spot on the light receiving element in the optical head, and using that signal for controlling the position of the light spot, as seen in the optical disc device disclosed in Japanese Patent Application Laid-Open No. H9-274726/1997, for example. (Such a servo is here called a spot position servo). In the conventional optical disc device proposed here, peak signal detection is performed on the light detection output indicating each of the light reception quantities in a bifurcated light receiving element, and the spot position signal is generated by taking the differential between the two signal detection results.

The conventional optical disc device described above, as shown in FIG. 12, comprises a tracking error signal generator circuit 1201 for generating tracking error signals, a tracking servo circuit 1202 that uses the tracking error signal generated here to control an objective lens so that the light spot follows an information track on the optical disc, a spot position signal generator circuit 1203 having a configuration for taking the differential between the two signal detection results and generating the spot position signal, a spot position servo circuit 1204 that, based on the spot position signal here generated, controls the position of an objective lens so that the light spot is positioned in the center of the light receiving element, and a changeover switch 1206 for switching the signal supplied to a tracking actuator 1205 that moves an objective lens in a radial direction on the optical disc. Ordinarily, the configuration is made so that, when so-called fast access is performed, wherein tracking servo processing is performed by the tracking servo circuit 1202, and the optical head is moved in a radial direction, the spot position servo is activated by the spot position servo circuit 1204. The purpose of activating the spot position servo at the time of fast access is to prevent movement in the objective lens during fast access.

However, when an attempt is made to actually implement such an operation as this, there is no guarantee that the outputs of the tracking servo circuit 1202 and the spot position servo circuit 1204 will coincide at the time of switching.

In FIG. 13 is plotted the low-frequency component of a drive signal that is supplied to the tracking actuator 1205 when switching between tracking servo processing and spot position servo processing in a conventional optical disc device. In the time period 1301 wherein the tracking servo is engaged, the drive signal will change to a sine wave due to the eccentricity of the optical disc because the light spot follows the information track. When the spot position servo is started (time period 1302), in conjunction with starting fast access, etc., a step difference will occur at the time of starting. Subsequently, when the spot position servo reaches the target position, the drive signal converges to an output that is according to the target position. Possible causes of the step difference in the drive signal noted above are the difference in open loop gain between the tracking servo and the spot position servo, and differences in the direct current offset between the tracking error signal and the spot position signal.

In particular, when the low-frequency component does not coincide, a step difference develops in the tracking actuator drive signal at the time of switching, whereupon the objective lens gets moved at high speed. Also, when fast access is started wherein the number of crossed tracks is detected from the light reflected from the optical disc, the speed of movement of the optical head is low, wherefore the objective lens movement speed becomes faster than the optical head movement speed, whereupon errors occur in the detection of the number of moving tracks.

DISCLOSURE OF THE INVENTION

An object of the present invention, in view of the points raised above, is to provide an optical disc device that, by always causing an objective lens to move smoothly, effects stabilized access operation and tracking servo operation.

In order to attain that object, the optical disc device described in claim 1 comprises: an optical head comprising light spot movement arrangement for causing a light spot directed onto an optical disc to move in a radial direction of the optical disc; tracking error signal generator for generating a tracking error signal indicating the relative positions of the light spot and information tracks on the optical disc; spot position signal generator for generating a spot position signal indicating the radial direction position of the light spot on a light receiving element in the optical head; tracking servo means for generating a tracking drive signal for driving the light spot movement arrangement so that the light spot follows the information track, based on the tracking error signal; spot position servo means for generating a spot position drive signal for driving the light spot movement arrangement so that the position of the light spot on the optical head is fixed, based on the spot position signal; selector for selecting one or other of the tracking drive signal and the spot position drive signal and supplying the same as a selected drive signal to the light spot movement arrangement; and discontinuation cancellation means for implementing processing, when the tracking drive signal and the spot position drive signal are switched between, so that the low-frequency components of the selected drive signal before switching and the selected drive signal after switching do not become discontinuous.

Further, the optical disc device described in claim 2 is the optical disc device described in claim 1, comprising discontinuation cancellation means for performing at least one of two processes, namely a first process for setting an initial value in the spot position servo means based on the low-frequency component of the tracking drive signal, when the selector switch the selected drive signal from the tracking drive signal to the spot position drive signal, and a second process for setting an initial value in the tracking servo means based on the low-frequency component of the spot position drive signal, when the selector switch from the spot position drive signal to the tracking drive signal.

Further, the optical disc device described in claims 3 and 5 is the optical disc device described in claim 1, comprising discontinuation cancellation means for diminishing the gain in the spot position servo means, for a predetermined time period, or until the spot position signal declines to or below a predetermined value, when the selector switch the selected drive signal from the tracking drive signal to the spot position drive signal.

Further, the optical disc device described in claims 4 and 6 is the optical disc device described in claim 1, comprising discontinuation cancellation means for diminishing the gain in the spot position servo means, for a predetermined time period, or until the tracking error signal declines to or below a predetermined value, when the selector switch the selected drive signal from the spot position drive signal to the tracking drive signal.

Further, the optical disc device described in claims 7 is the optical disc device described in claim 1, comprising discontinuation cancellation means that internally comprise spot position signal memory means for storing spot position signals, processing means for performing processes on spot position signals stored by the spot position signal memory means, and spot position servo target setting means for setting servo targets for the spot position servo means, wherein, when the selector switch the selected drive signal from the tracking drive signal to the spot position drive signal, the spot position signal is stored by the spot position signal memory means, and the output of the processing means is made the servo target that is set by the spot position servo target setting means.

Further, the optical disc device described in claims 8 is the optical disc device described in claim 1, wherein the tracking servo means have means for extracting the low-frequency component of the tracking error signal, and the spot position servo means have means for extracting the low-frequency component of the spot position signal.

And the optical disc device described in claims 9 is the optical disc device described in claim 6, wherein the discontinuation cancellation means, when the tracking drive signal and the spot position signal are switched between, perform control to set the low-frequency component of the selected drive signal after switching so that the low-frequency component of the selected drive signal after switching becomes equal to the low-frequency component of the selected drive signal before switching.

BRIEF DESCRIPTION OF THE DRAWINGS

FIG. 4 is a waveform diagram representing the low-frequency component of a drive signal supplied to a tracking actuator in the first embodiment aspect;

FIG. 5 is a waveform diagram representing the low-frequency component of a drive signal supplied to a tracking actuator for describing a second embodiment aspect of the present invention;

BEST MODE FOR CARRYING OUT THE INVENTION

Embodiment aspects of the present invention are now described with reference to the drawings.

A first embodiment aspect of the present invention is described on the basis of FIGS. 1 to 4.

Figure 1:
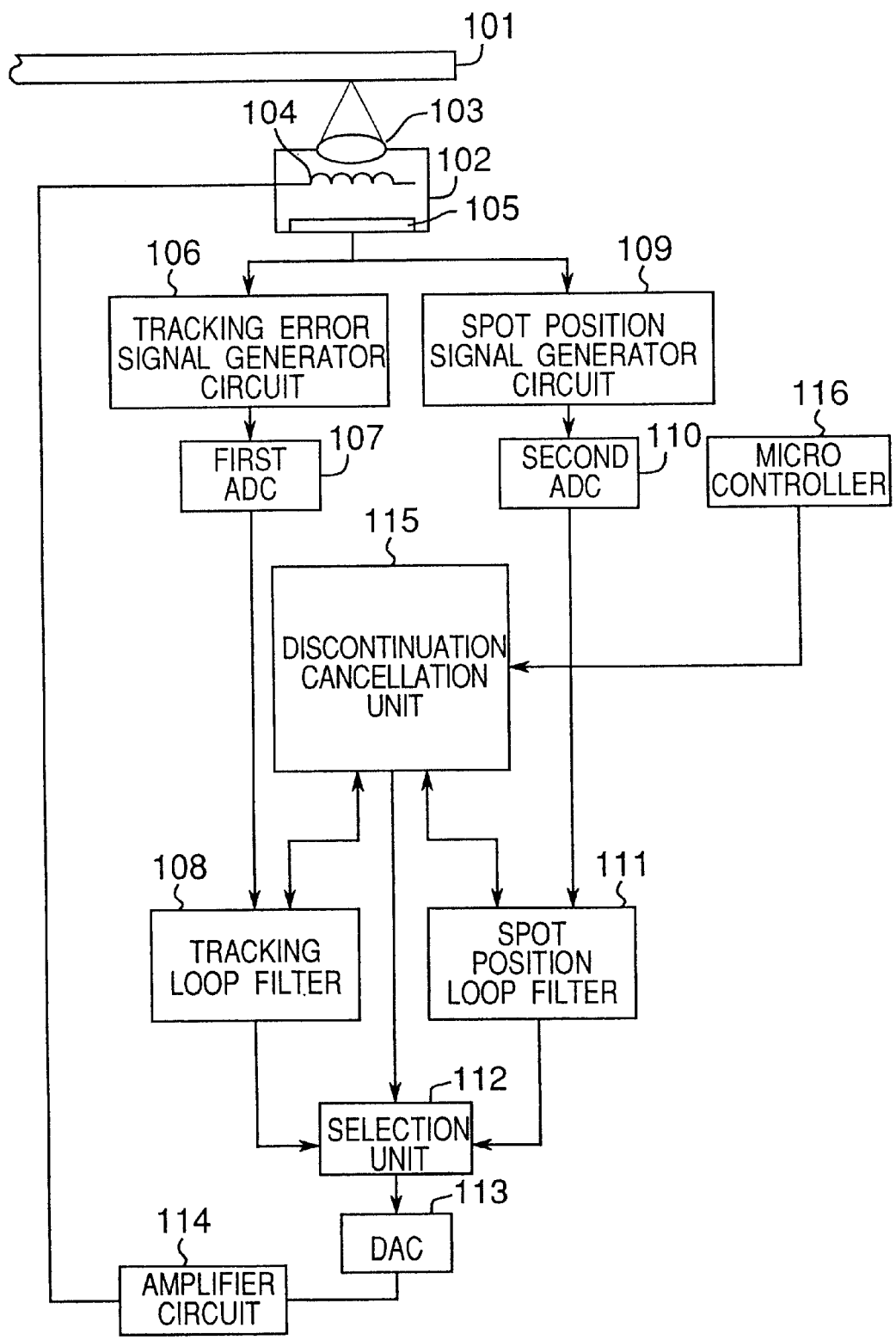
FIG. 1 is a block diagram of a configuration for moving an objective lens in an axial direction in an optical disc device for describing a first embodiment aspect of the present invention.

FIG. 1 is a block diagram of a configuration for moving an objective lens in an axial direction in an optical disc device in the present invention, wherein 101 is an optical disc, and 102 is an optical head that internally comprises an objective lens 103, a tracking actuator 104 that constitutes light spot movement arrangement, and a light receiving element 105. The objective lens 103 condenses a light beam emitted by a laser diode (not shown) or other light source, and directs it to the optical disc 101. The tracking actuator 104 moves the objective lens 103 in a radial direction. When the objective lens 103 moves in a radial direction, the light spots on the optical disc 101 and on the light receiving element 105 likewise move. The light receiving element 105 receives light reflected by the optical disc, converting that light to an electrical signal according to the received light quantity.

Item 106 is a tracking error signal generation circuit for generating tracking error signals from the electrical signals output by the light receiving element 105. Item 107 is a first AD (analog-to-digital) converter for AD converting the tracking error signals. Item 108 is a tracking loop filter constituting tracking servo means for generating tracking drive signals. Item 109 is a spot position signal generation circuit for generating spot position signals indicating the position of the light spot on the light receiving element 105 from electrical signals output by the light receiving element 105. Item 110 is a second AD converter for AD converting spot position signals. Item 111 is a spot position loop filter constituting spot position servo means for generating spot position drive signals by subjecting the spot position signals to signal processing such as phase compensation. Item 112 is a selection unit constituting selector for inputting a tracking drive signal and a spot position drive signal and outputting one or other as a selected drive signal. Item 113 is a DA (digital-to-analog)converter that DA converts the selected drive signal and outputs that converted signal. Item 114 is an amplifier circuit that amplifies the output of the DA converter and sends that amplified output to the tracking actuator 104. Item 115 is a discontinuation cancellation unit for canceling step differences that develop in the selected drive signal in conjunction with the switching of the selection unit 112. And item 116 is a micro controller for instructing the switching of the tracking servo and spot position servo.

Figure 14:
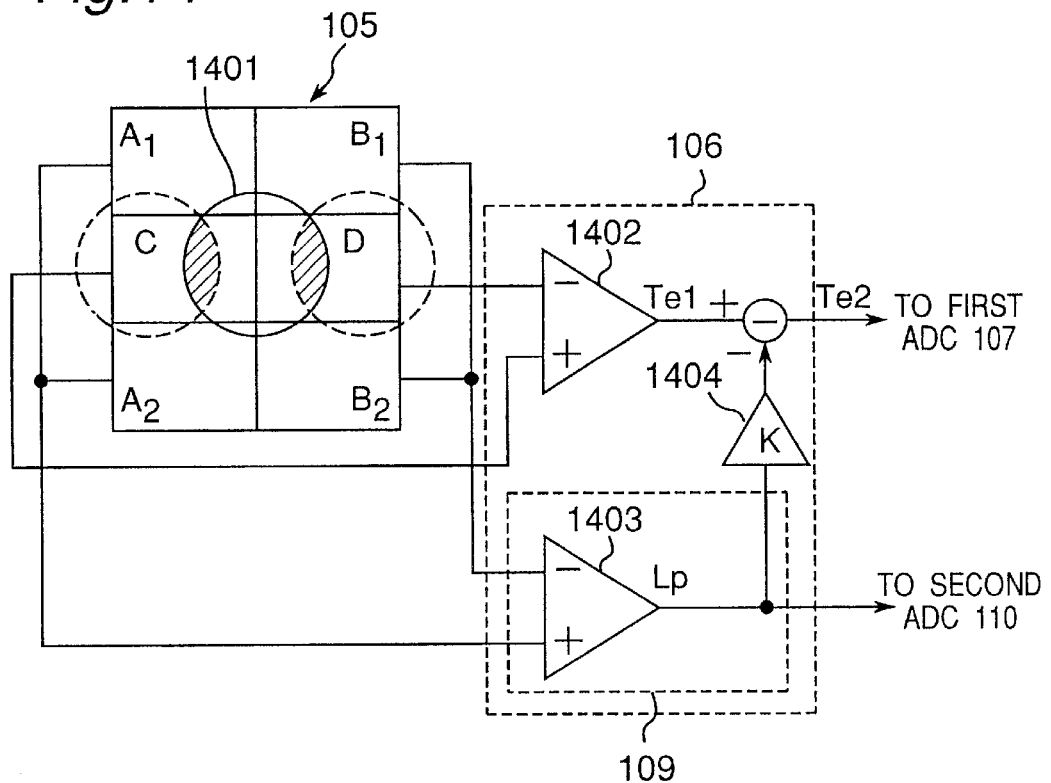
FIG. 14 is a configuration diagram of a light receiving element and the peripheral circuitry thereof.
Figure 15:
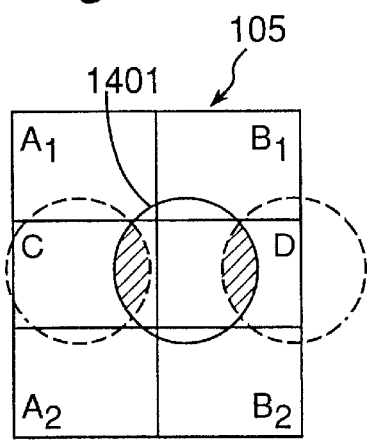
FIG. 15 is an explanatory diagram representing a spot directed onto a light receiving element.
Figure 16:
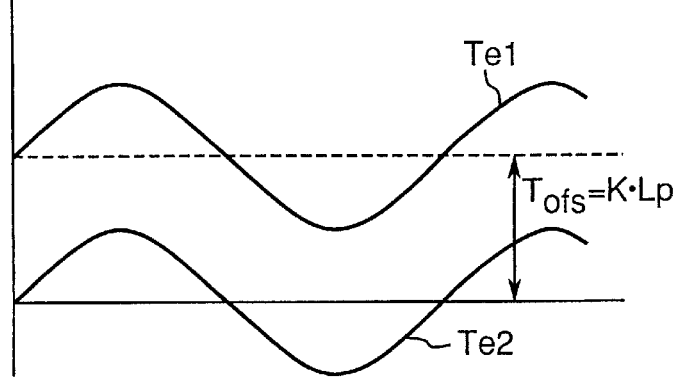
FIG. 16 is a waveform diagram of a tracking error signal and a signal that is the basis of a spot position signal.

The tracking error signal generation circuit 106 and spot position signal generation circuit 109 are now described using FIGS. 14, 15, and 16.

In the example shown in FIG. 14, the light receiving element 105 is divided into two parts in a direction corresponding to the tracks, and further divided into three parts in a direction crossing the tracts, thereby forming a total of six divided areas A1, B1, C, D, A2, and B2.

Item 1401 is a light spot incident on the light receiving element 105. Item 1402 is a differential amplifier that outputs the difference Te1 between the outputs of the two areas C and D in the center of the light receiving element 105. Item 1403 is a differential amplifier that outputs the difference Lp in the total output of the areas A1 and A2 on the left side, and the total output of the areas B1 and B2 on the right side, in the four areas A1, A2, B1, and B2 at the edges of the light receiving element 105. Item 1404 is a coefficient multiplier that multiplies the output of the differential amplifier 1403 by a coefficient K and outputs the product K·Lp. Item 1405 is a subtractor that subtracts the output of the coefficient multiplier 1405 from the output of the differential amplifier 1402 and outputs the difference (Te2=Te1−K·Lp). These elements 1402, 1403, 1404, and 1405 configure the tracking error signal generation circuit 106. The tracking error signal Te2 that is the output thereof is sent to the first AD converter 107. The element 1403 configures a spot position signal generation circuit. The spot position signal Lp that is the output thereof is sent to the second AD converter 110.

FIG. 15 is a diagram that represents the positions of the light spot 1401 and the light receiving element 105 when the objective lens 103 has been displaced.

FIG. 16 is a diagram representing the tracking error signals when the objective lens 103 has been displaced.

When the objective lens 103 is directly above the light receiving element 1401, the light spot 1401 is positioned roughly in the center of the light receiving element 105 as shown in FIG. 14. The light spot 1401 consists of two first-order light components diffracted by the information tracks on the optical disc 101 (indicated by the dotted circles), and a zero-order light component that is not influenced by diffraction (indicated by the solid circle). The push-pull type tracking error signal Te1 is found by finding the difference in the light quantity in the areas influenced by the first-order light in areas C and D (shadowed portions in the light spot 1401), using the differential amplifier 1402.

Meanwhile, the edge areas A1, A2, B1, and B2 on the light receiving element 105 are hardly influenced at all by the first-order light, wherefore the output Lp that is the difference between the left and right edge areas detected by the differential amplifier 1403 indicates the amount of displacement in the light spot 1401 on the light receiving element 105 accompanying the movement of the objective lens 103, and can be used as the spot position signal.

$$Lp=A-B$$

where A=A1+A2, and B=B1+B2

When the objective lens 103 is displaced in a direction traversing the information tracks, the light spot 1401 is displaced also along with the objective lens 103, as shown in FIG. 15. Thereupon, in area C and area D, a difference develops in the area of the portion not affected by first-order light (portion of the light spot 1401 not shadowed). This difference appears as the offset Tofs in the tracking error signal shown in FIG. 16. This offset Tofs is produced according to the amount of displacement in the light spot 1401 relative to the light receiving element 105, wherefore, using the spot position signal Lp described earlier, this can be represented as shown below.

$$Tofs=K \times Lp$$

In this embodiment aspect, in order to remove the offset Tofs in the Te1 described above, the spot position signal Lp is multiplied by a suitable correction coefficient K, using the coefficient multiplier 1404, and that product is subtracted from Te1 by the subtractor 1405. That is, the subtractor 1405 computes $$Te2=Te1-K \times Lp$$

and outputs Te2. Te2 becomes a tracking error signal from which the offset Tofs according with the spot position has been removed, and the tracking loop filter 108 inputs that signal through the first AD converter 106 and implements a tracking servo.

The spot position signal Lp, while being used in removing the offset of the tracking error signal, also goes into the spot position loop filter 111 via the second AD converter 110 and is used in the spot position servo. The spot position servo is used in determining the position of the light spot 1401 relative to the light receiving element 105, and, depending on the attitude of the equipment, can be used in correcting for displacements induced by the weight of the objective lens 103 itself, or in suppressing vibration in the objective lens 103 during access.

Figure 2:
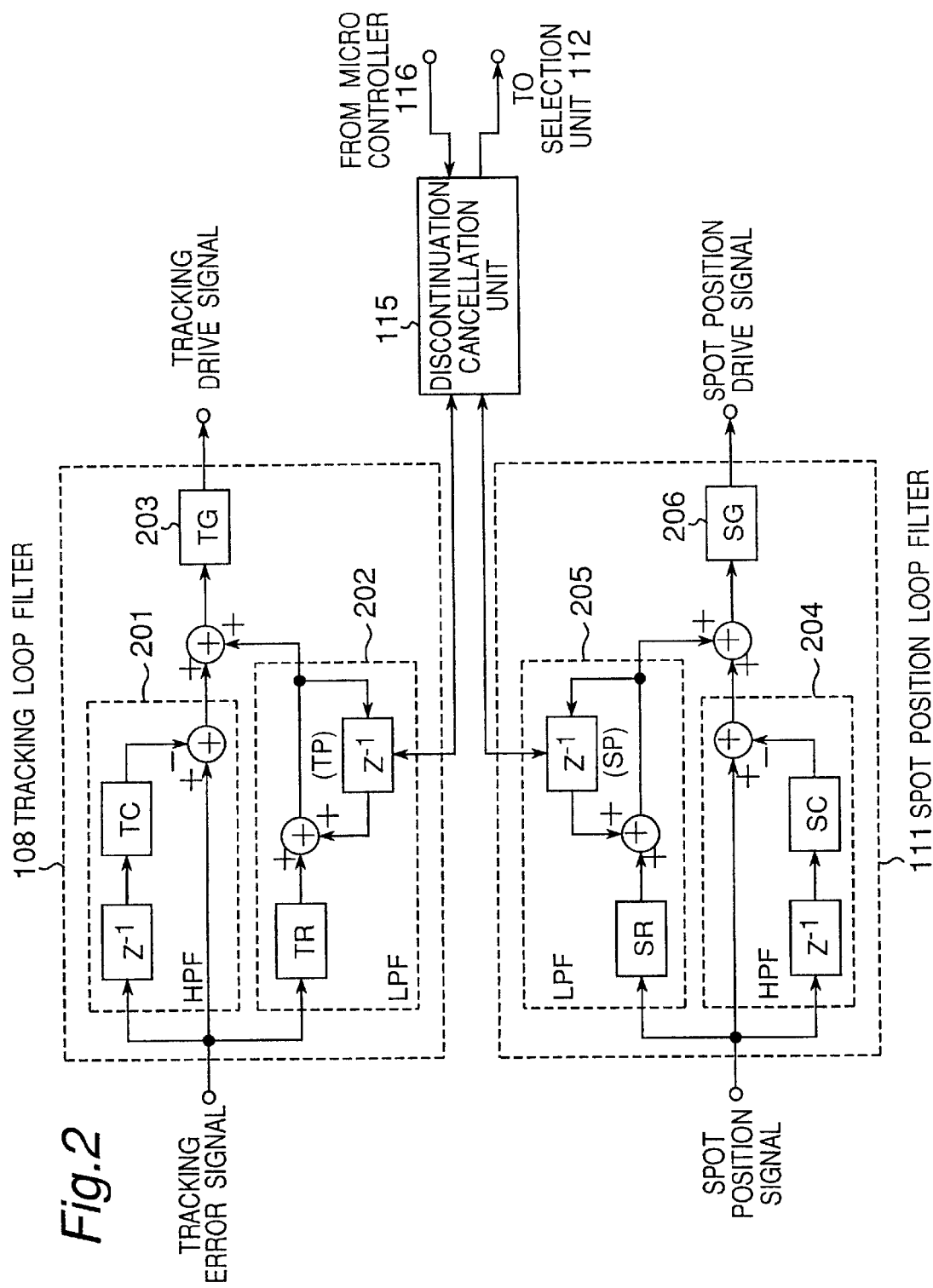
FIG. 2 is a block diagram of the configuration of a tracking loop filter, spot position loop filter, and discontinuation cancellation unit in the first embodiment aspect.
Figure 3:
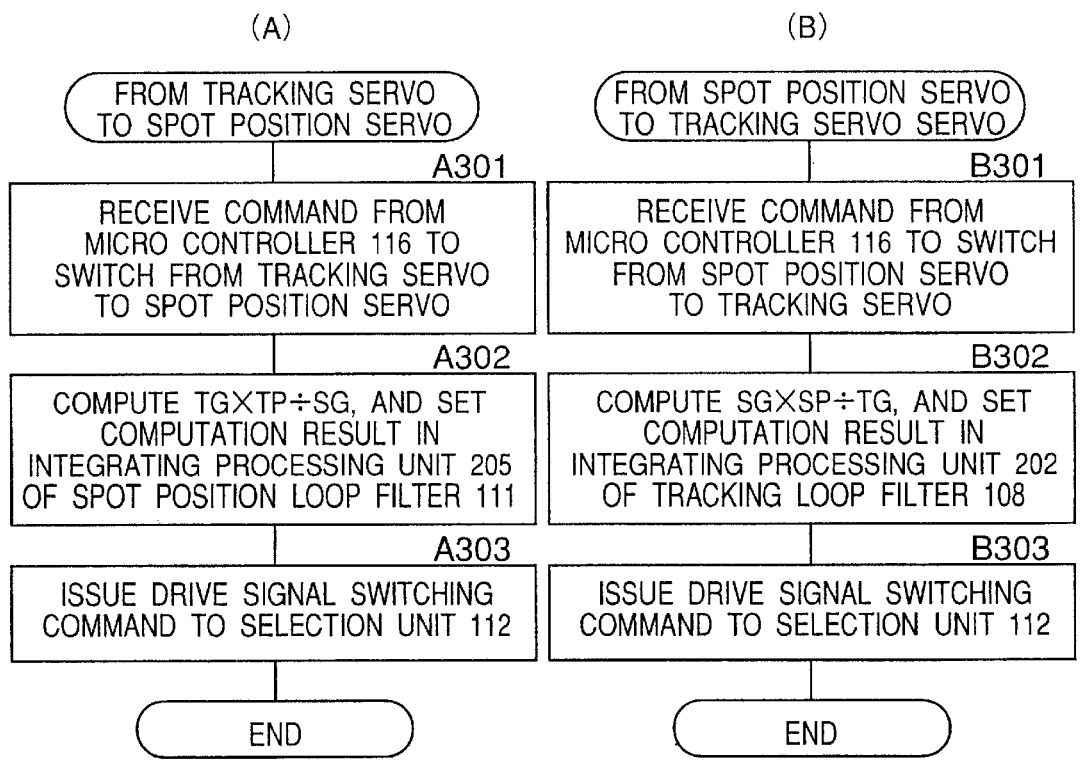
FIG. 3 shows flowcharts relating to operations of the discontinuation cancellation unit in the first embodiment aspect.

FIG. 2 is a block diagram of the configuration of a tracking loop filter 108, spot position loop filter 111, and discontinuation cancellation unit 115 in the first embodiment aspect. Item 201 is a differentiating processing unit for the tracking loop filter 108. Item 202 is an integrating processing unit for the tracking loop filter 108. Item 203 is a proportion processing unit for the tracking loop filter 108.

Item 204 is a differentiating processing unit for the spot position loop filter 111. Item 205 is an integrating processing unit for the spot position loop filter 111. And item 206 is a proportion processing unit for the spot position loop filter 111.

FIGS. 3(A) and 3(B) are flowcharts relating to operations (described later) of the discontinuation cancellation unit 115 when switching between the tracking servo and the spot position servo. FIG. 3(A) is a flowchart for during the switching from the tracking servo to the spot position servo, and FIG. 3(B) is a flowchart for when switching from the spot position servo to the tracking servo.

FIG. 4 is a waveform diagram representing the low-frequency component of a drive signal supplied to the tracking actuator 104 when switching between tracking servo processing and spot position servo processing, in the first embodiment aspect. In FIG. 4, the magnitude of the low-frequency component of the drive signal is plotted on the vertical axis and time is plotted on the horizontal axis.

Next, the operations of the optical disc device in the first embodiment aspect are described. First the case is described where the tracking servo is engaged. The light receiving element 105 receives light reflected by the optical disc 101, and outputs an electrical signal that accords with the quantity of light received to the tracking error signal generation circuit 106. In the tracking error signal generation circuit 106, a tracking error signal indicating the relative position of the light spot and the information track on the optical disc 101 is generated from the electrical signal output by the light receiving element 105.

The tracking error signal generation circuit 106 sends the generated tracking error signal via the first AD converter 107 to the tracking loop filter 108. The tracking loop filter 108, which has the differentiating processing unit 201 that configures a high-pass filter, the integrating processing unit 202 that configures a low pass filter, and the proportion processing unit 203, as shown in FIG. 2, subjects the tracking error signal to phase compensation and outputs the result as a tracking drive signal. That is, the differentiating processing unit 201 enhances the high-frequency component of the tracking error signal while the integrating processing unit 202 enhances the low-frequency component of that signal. The signal indicated in the time period 401 in FIG. 4, described later, is the low-frequency component signal from the integrating processing unit 202. This low-frequency component signal from this integrating processing unit 202 is represented by TP. The output signals from the two processing units 201 and 202, after being totaled, are multiplied by a predetermined coefficient TG and output as a tracking drive signal. The low-frequency component of the tracking drive signal is represented by TP×TG.

The tracking drive signal goes into the selection unit 112. The selection unit 112 outputs the tracking drive signal to the DA converter 113. The DA converter 113 DA converts the input signal and sends the resulting signal to the amplifier circuit 114. In the amplifier circuit 114, the input signal is amplified, and then sent to the tracking actuator 104. The tracking actuator 104 drives the objective lens 103 in accord with the signal sent to it. The tracking servo is implemented by this chain of actions and the light spot follows the information track.

Next, the case where the spot position servo is engaged is described. In parallel with the operations described above, the light receiving element 105 sends an electrical signal to the spot position signal generation circuit 109, and a spot position signal is generated from the electrical signal received at the spot position signal generation circuit 109 and sent via the second AD converter 110 to the spot position loop filter 111.

The spot position loop filter 111, which has the differentiating processing unit 204 that configures a high-pass filter, the integrating processing unit 205 that configures a low-pass filter, and the proportion processing unit 206, as shown in FIG. 2, subjects the spot position signal to phase compensation and outputs the resulting signal as a spot position drive signal. That is, the differentiating processing unit 204 enhances the high-frequency component of the spot position signal, while the integrating processing unit 205 enhances the low-frequency component. The signal indicated in the time period 404 in FIG. 4, described later, is a low-frequency component signal from the integrating processing unit 205. This low-frequency component signal from this processing unit 205 is represented by SP. The output signals from the two processing units 204 and 205, after being totaled, are multiplied by a predetermined coefficient SG and output as a spot position drive signal. The low-frequency component of the spot position drive signal is represented by SP×SG.

In cases such as when fast access is performed, when the spot position servo is switched to from the tracking servo, the discontinuation cancellation unit 115, following the flowchart given in FIG. 3(A), effects control so that the transition from the amplified value TP×TG of the low-frequency component of the tracking drive signal to the amplified value SP×SG of the low-frequency component of the spot position drive signal is made smoothly. That is, processing is performed to prevent the occurrence of a step difference in the signal driving the tracking actuator 104. When the command to switch from the tracking servo to the spot position servo issued by the micro controller 116 is received (A301), the value integrated by the integrating processing unit 202 of the tracking loop filter 108 is subjected to the processing indicated by the equation (1) below and the result is set as the initial value in the integrating processing unit 205 of the spot position loop filter 111 (A302).

$$SP = TG \times TP \div SG \quad (1)$$

where TP is the integral value of the integrating processing unit 202 of the tracking loop filter 108, SP is the integral value of the integrating processing unit 205 of the spot position loop filter 111, TG is the gain of the proportion processing unit 203 of the tracking loop filter 108, and SG is the gain of the proportion processing unit 206 of the spot position loop filter 111.

The processing described above connotes a transfer of the low-frequency component from the tracking loop filter 108 to the spot position loop filter 111. When this processing is performed, the step difference in the signal driving the tracking actuator 104 is cancelled. In this embodiment aspect, the gains TG and SG are predetermined values. The integral value TP is a value that fluctuates with the tracking error signal. The integral value SP is a value that fluctuates with the spot position signal. In this embodiment aspect, when switching from the tracking servo to the spot position servo, the integral value SP is set to a value obtained from the equation (1) given above, rather than to a value obtained from the spot position signal, and control is effected so that that value is subsequently transferred to a value dependent on the spot position signal. This switching is now described further.

When the value of the tracking drive signal based on the TP is made TPD, TPD is expressed by the equation (2) below.

$$TPD = TP \times TG \quad (2)$$

In contrast thereto, when the succeeding spot position drive signal, is sought, if the value output by the integrating processing unit 205 of the spot position loop filter 111 is made SP, then we have formula (3) below, $$SP \times SG = TPD \quad (3)$$

but since $$SP \times SG = TP \times TG$$

we get $$SP = TG \times TP \div SG$$

and thus formula (1) given earlier is derived.

When the setting of the initial value in the integrating processing unit 205 has been completed, the discontinuation cancellation unit 115 sends a drive signal switching command to the selection unit 112 (A303). The selection unit 112 receives that signal and sends a spot position drive signal to the DA converter 113.

In the spot position loop filter 111, the supplied spot position signal is subjected to processing such as phase compensation, using the differentiating processing unit 204, integrating processing unit 205, and proportion processing unit 206, and output as a spot position drive signal. The spot position drive signal passes through the selection unit 112, DA converter 113, and amplifier circuit 114 to enter the tracking actuator 104 whereupon the tracking actuator 104 moves the objective lens 103. The spot position servo is implemented by this series of operations.

Conversely, when transitioning from the spot position servo to the tracking servo, control is effected to make the transition from the amplified value SP×SG of the low-frequency component of the spot position drive signal to the amplified value TP×SG of the low-frequency component of the tracking drive signal smoothly. That is, the discontinuation cancellation unit 115 receives a command to switch from the spot position servo to the tracking servo from the micro controller 116 (B301), and determines the initial value for the integrating processing unit 202 of the tracking loop filter 108 from the integral value of the integrating processing unit 205 of the spot position loop filter 111, the gain of the proportion processing unit 206, and the gain of the proportion processing unit 203 of the tracking loop filter 108. This initial value is found by formula (4) below.

$$TP = SG \times SP \div TG \quad (4)$$

where TP is the integral value of the integrating processing unit 202 of the tracking loop filter 108, SP is the integral value of the integrating processing unit 205 of the spot position loop filter 111, TG is the gain of the proportion processing unit 203 of the tracking loop filter 108, and SG is the gain of the proportion processing unit 206 of the spot position loop filter 111. By making this TP the initial value in the integrating processing unit 202, the step difference in the low-frequency component of the signal driving the tracking actuator 104 can be done away with. The discontinuation cancellation unit 115 sets the TP calculated in this way in the integrating processing unit 202 (B302), and sends a drive signal switching command to the selection unit 112 (B303). The selection unit 112 selects the tracking drive signal and sends it to the DA converter 113.

Thereafter, the DA converter 113 DA converts the input signal and sends the resulting signal to the amplifier circuit 114. The amplifier circuit 114 amplifies that input signal and then sends it to the tracking actuator 104. The tracking actuator 104 moves the objective lens 103 on the basis of that input signal, and the tracking servo is implemented.

The low-frequency component of the signal sent to the tracking actuator 104 when the chain of operations described thus far has been performed exhibits the movements shown in FIG. 4. It should be noted, however, that FIG. 4 represents the movements of the low-frequency component in the case where the optical disc device has been assembled so that the optical head 102 moves vertically, up and down. In the time period (401) where the tracking servo is engaged, the low-frequency component, following the eccentricity of the optical disc 101, is changed to a sine wave. Accordingly, one period of the sine wave corresponds to one revolution of the optical disc. At the point in time (402) where the spot position servo is switched to, the integral value SP is initialized to the value found by formula (1) given earlier, by the operation of the discontinuation cancellation unit 115. Therefore, the value of the spot position drive signal when switching from the tracking servo to the spot position servo becomes equal to the value of the tracking drive signal. In this manner, the low-frequency component changes continuously when being transferred from the tracking servo to the spot position servo. The low-frequency component changes toward the target value of the spot position servo according to a speed determined by the loop gain of the spot position servo (time period 403), and stabilizes when the target position for the spot position servo is reached (time period 404).

In FIG. 4, it is because the optical disc device stands upright that the stabilizing point of the low-frequency components is not zero in the time period where the spot position servo is engaged. Even when switching from the spot position servo to the tracking servo, a suitable value is set in the integrating processing unit 202 of the tracking loop filter 108 by the discontinuation cancellation unit 115 at the time of switching (405). Therefore the switching to the tracking servo is performed, without a step difference being produced in the low-frequency component, and the tracking servo is thereafter implemented (time period 407).

Engaging the spot position servo prior to implementing the tracking servo is particularly effective when bringing up the optical disc device. That is, by positioning the objective lens 103 near the center of the light receiving element 105 with the spot position servo before engaging the tracking servo, the laterally movable range of the objective lens 103 can be maximized, and the tracking lead-in operation is stabilized. The low-frequency component of the signal supplied to the tracking actuator 104 when the spot position servo is engaged has a value just sufficient to counter gravity. Consequently, in this embodiment aspect, by carrying over the low-frequency component of the spot position servo to the low-frequency component of the tracking servo, a low-frequency component that balances the gravitational force even at the point in time when the tracking servo is started can be output, and the merit realized by engaging the spot position servo beforehand, as described in the foregoing, can be effectively utilized.

Based on the first embodiment aspect, as described in the foregoing, as a result of providing a discontinuation cancellation unit 115 that cancels the step differences arising in the low-frequency components of the signals supplied to the tracking actuator 104 when switching between the tracking servo and the spot position servo, the objective lens 103 will no longer move suddenly at the time of switching. This is extremely effective, when effecting fast access, in improving access precision, and in improving the stability of tracking servo lead-in when the objective lens is displaced from the center of the light receiving element by the attitude of the apparatus.

Inside the discontinuation cancellation unit 115, by subjecting the integral value of the integrating processing unit 202 in the tracking loop filter 108 to predetermined processing, and setting the results of that processing in the integrating processing unit 205 of the spot position loop filter 111, when switching from the tracking servo to the spot position servo, or, alternatively, by subjecting the integral value of the integrating processing unit 205 of the spot position loop filter 111 to predetermined processing, and setting the results of that processing in the integrating processing unit 202 of the tracking loop filter 108, it is possible to transfer the low-frequency component between the servos, and to smoothly change the output of the selection unit 112, without being influenced by the spot position error signal and tracking error signal offset.

Let us here give close attention to the changes in the low-frequency component of the signal driving the tracking actuator 104 during some period of time immediately after switching from the tracking servo to the spot position servo in this first embodiment aspect. In FIGS. 5(A) and 5(B) are given wave diagrams for the low-frequency component of the drive signal sent to the tracking actuator 104 when switching from the tracking servo to the spot position servo. Magnitude is plotted on the vertical axis and time on the horizontal axis. Ordinarily, in order to diminish servo residuum, the servo loop gain is set quite high. For this reason, as shown in FIG. 5(A), when transitioning from the tracking servo (time period 501) to the spot position servo (time period 502), the low-frequency component of the drive signal supplied to the tracking actuator 104 at the moment of the transition (503) changes continuously, but the spot position drive signal changes rapidly so that the spot position signal becomes zero, due to the gain of the spot position servo (time period 504). There is, as a consequence, a danger of the objective lens 103 vibrating, which is a problem.

The problem described above is resolved with the optical disc device of the second embodiment aspect of the present invention. This second embodiment aspect is described using FIGS. 5 to 7.

FIGS. 5(A) and 5(B) are diagrams that represent the low-frequency component of the drive signal supplied to the tracking actuator 104, with FIG. 5(A) representing the case where the gain of the spot position servo is constant and FIG. 5(B) the case where the gain of the spot position servo is varied, which is the case of this second embodiment aspect. In FIG. 5, signal magnitude is plotted on the vertical axis and time is plotted on the horizontal axis.

Figure 6:
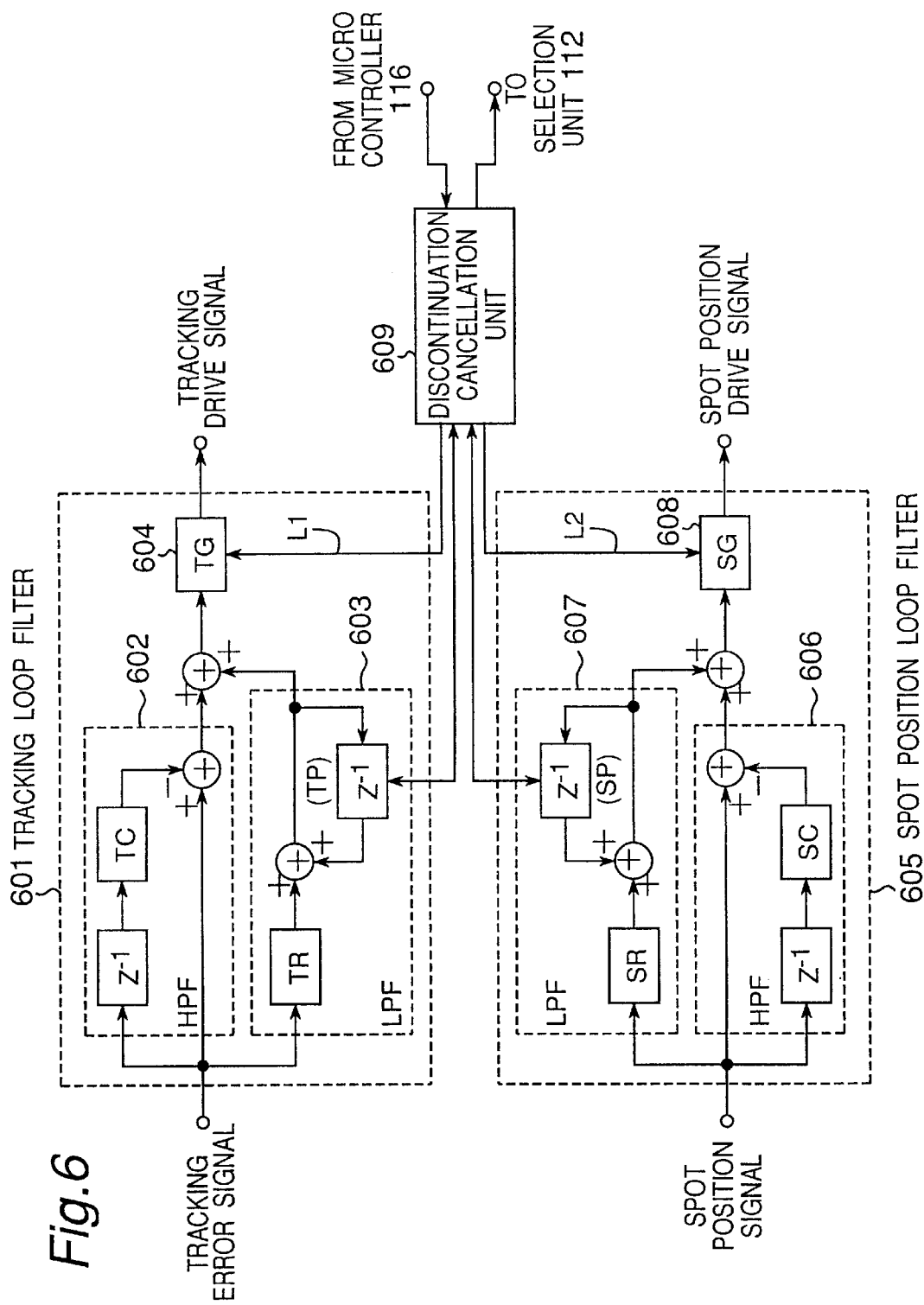
FIG. 6 is a block diagram of the configuration of a tracking loop filter, spot position loop filter, and discontinuation cancellation unit in the second embodiment aspect.

FIG. 6 is a block diagram of the configuration of a tracking loop filter 601, spot position loop filter 605, and discontinuation cancellation unit 609 in the second embodiment aspect. The tracking loop filter 601, spot position loop filter 605, and discontinuation cancellation unit 609 in the second embodiment aspect, respectively, correspond to the tracking loop filter 108, spot position loop filter 111, and discontinuation cancellation unit 115 in the optical disc device in the first embodiment aspect. In the second embodiment aspect, except for these three elements, the configuration is the same as the configuration in the first embodiment aspect. The second embodiment aspect differs from the first embodiment aspect in that control lines L1 and L2 are added from the discontinuation cancellation unit 609 to proportion processing units 604 and 608. By means of the control line L2, the gain SG of the proportion processing unit 608 is decreased (by half, for example) to a predetermined quantity immediately prior to switching from the tracking servo to the spot position servo, and then, when the servo has been switched, after a predetermined time (from 10 msec to 100 msec) has elapsed, that gain SG is restored to its original value. Likewise, by means of the control line L1, the gain TG of the proportion processing unit 604 is decreased (by half, for example) to a predetermined quantity immediately prior to switching from the spot position servo to the tracking servo, and then, when the servo has been switched, after a predetermined time (from 10 msec to 100 msec) has elapsed, that gain PG is restored to its original value.

Figure 7:
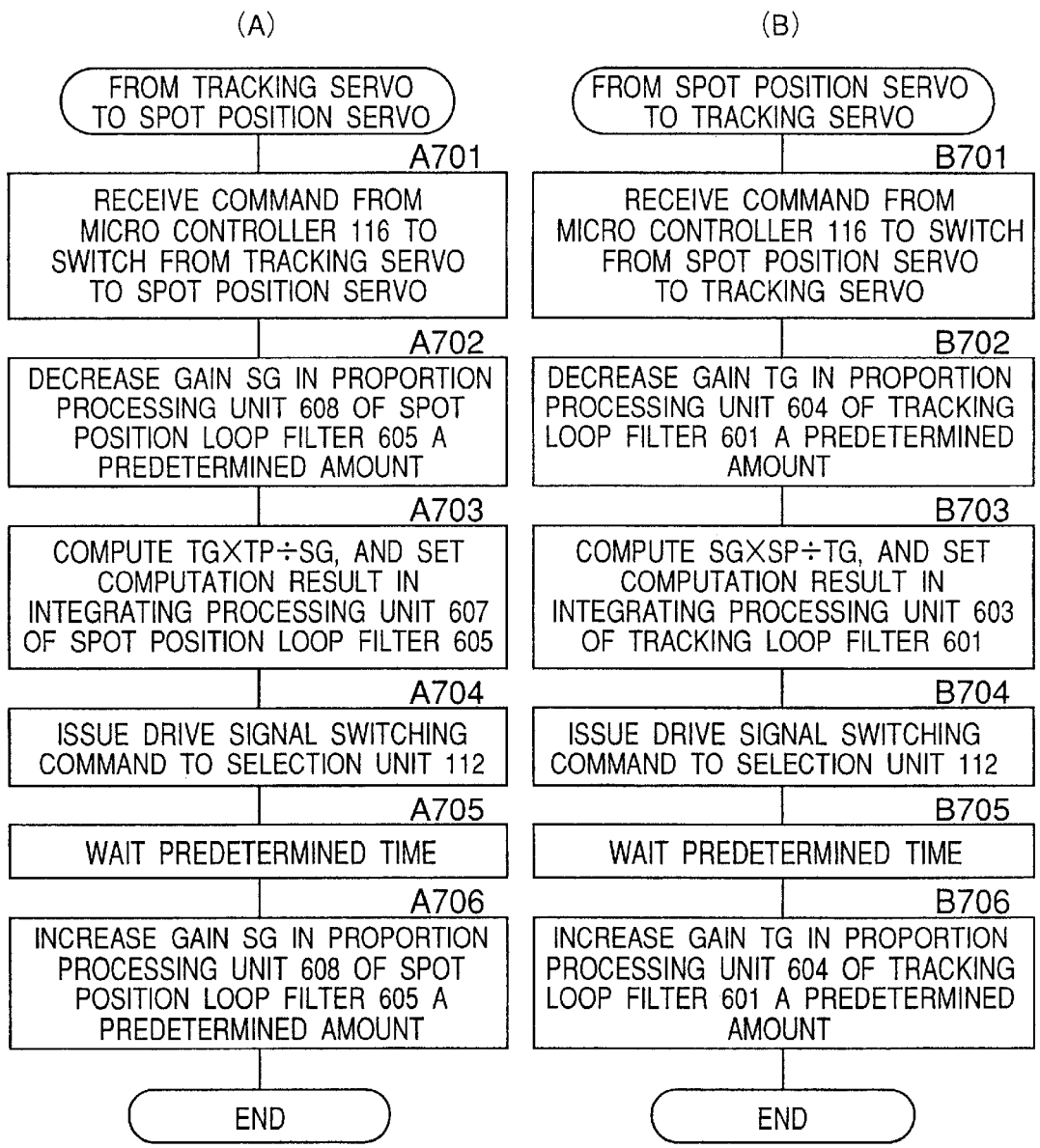
FIG. 7 shows flowcharts relating to the processing of the discontinuation cancellation unit in the second embodiment aspect.

FIG. 7 shows flowcharts for the processes performed by the discontinuation cancellation unit 609 in the second embodiment aspect.

The operations of the optical disc device in the second embodiment aspect are now described.

The micro controller 116, as necessary, at the beginning of fast access processing, for example, sends a command to switch from the tracking servo to the spot position servo to the discontinuation cancellation unit 609. In the discontinuation cancellation unit 609, processing is performed that follows the flowchart given in FIG. 7(A), and the low-frequency component of the drive signal supplied to the tracking actuator 104 is prevented from changing suddenly. First, when the command to switch from the tracking servo to the spot position servo is received from the micro controller 116 (A701), the gain SG of the proportion processing unit 608 of the spot position loop filter 605 is decreased by a predetermined amount (by half, for example) (A702). Next, the integral value TP in the integrating processing unit 603 of the tracking loop filter 601 is subjected to the same processing as in the first embodiment aspect, and the result is set in the integrating processing unit 607 of the spot position loop filter 605 (A703). Then a drive signal switching command is issued to the selection unit 112 (A704), and processing waits for a predetermined time (10 msec to 100 msec) to elapse (A705). When that predetermined time has elapsed, the gain SG of the proportion processing unit 608 of the spot position loop filter 605 is increased by the same amount by which it was decreased in the earlier step (A702)(A706).

As a result of performing such processing as this, for a predetermined period of time after switching from the tracking servo to the spot position servo, the gain of the spot position servo will decline, and, as shown in FIG. 5(B), the time required until the spot position servo converges will become longer (505). This means that the speed becomes slower when the objective lens 103 moves to the target point of the spot position servo.

As described in the foregoing, in the optical disc device in the second embodiment aspect, when switching from the tracking servo to the spot position servo, sudden changes in the position of the objective lens 103 can be eliminated by having the discontinuation cancellation unit 609 decrease the gain of the spot position servo for a predetermined period of time, whereupon the problem of deterioration in the access precision during fast access caused by sudden movements of the objective lens 103 can be resolved.

Furthermore, with the second embodiment aspect, the gain of the spot position servo is decreased for a predetermined period of time, but it is also permissible to have the discontinuation cancellation unit 609 monitor the spot position signal, and to return the gain of the spot position servo to a normal value as soon as a predetermined range is entered (at the point in time when the spot position servo has more or less converged). With that method, the processing involved in monitoring the spot position signal is added, but the time that the gain is decreased becomes shorter, which is an advantage.

FIG. 7(B) is a flowchart for controlling the switching from the spot position servo to the tracking servo. First, when a command to switch from the spot position servo to the tracking servo is received from the micro controller 116 (B701), the gain TG of the proportion processing unit 604 of the tracking loop filter 601 is decreased by a predetermined amount (by half, for example) (B702). Next, the integral value SP in the integrating processing unit 607 of the spot position loop filter 605 is subjected to the same processing as in the first embodiment aspect, and the result is set in the integrating processing unit 603 of the tracking loop filter 601 (B703). Then a drive signal switching command is issued to the selection unit 112 (B704), and processing waits for a predetermined period of time (10 msec to 100 msec) to elapse (B705). When that predetermined time has elapsed, the gain TG of the proportion processing unit 604 of the tracking loop filter 601 is increased by the same amount that it was decreased in the earlier step (B702) (B706).

Based on the second embodiment aspect, when switching is performed between the tracking servo and the spot position servo, the gain of the proportion processing unit on the switching side is decreased (by half, for example) to a predetermined quantity, immediately prior to switching, and then servo switching is performed. After a predetermined period of time (10 msec to 100 msec) has elapsed, that gain is restored to its original value. Thus, during the switching transition period, it becomes possible to effect switching smoothly, without causing fluctuations such as overshooting between the tracking servo and the spot position servo.

Figure 8:
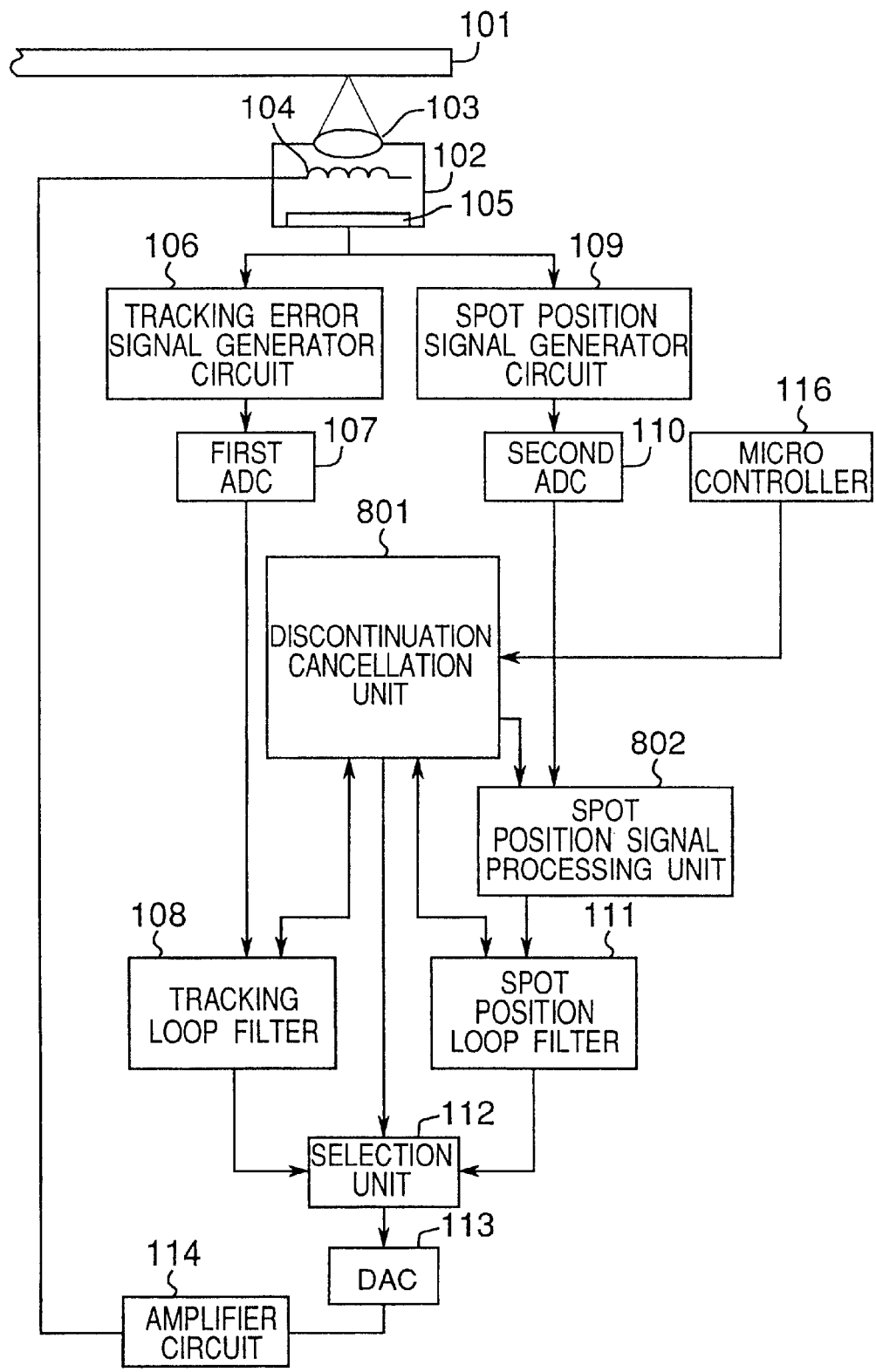
FIG. 8 is a block diagram of a configuration for driving an objective lens in an axial direction in an optical disc device for describing a third embodiment aspect of the present invention.

A third embodiment aspect is described next. An object in the third embodiment aspect, as in the second embodiment aspect, is to stabilize the transition state from the time that the spot position servo starts until it stabilizes. In FIG. 8 is given a block diagram of an optical disc device based on the third embodiment aspect. In FIG. 8, items 101 to 116 are the same as those used in describing the first embodiment aspect. Accordingly, the configuration indicated in FIG. 2 is used. Item 801 is the discontinuation cancellation unit in the third embodiment aspect, which receives switching commands from the micro controller 116 and performs processing that follows the flowchart given in FIG. 10 with respect to the tracking loop filter 108, spot position loop filter 111, selection unit 112, and spot position signal processing unit 802. Item 802 is a spot position signal processing unit that inputs the analog-to-digital converted spot position signal output by the second AD converter 110, subjects that signal to processing described later, and outputs the resulting signal to the spot position loop filter 111.

Figure 9:
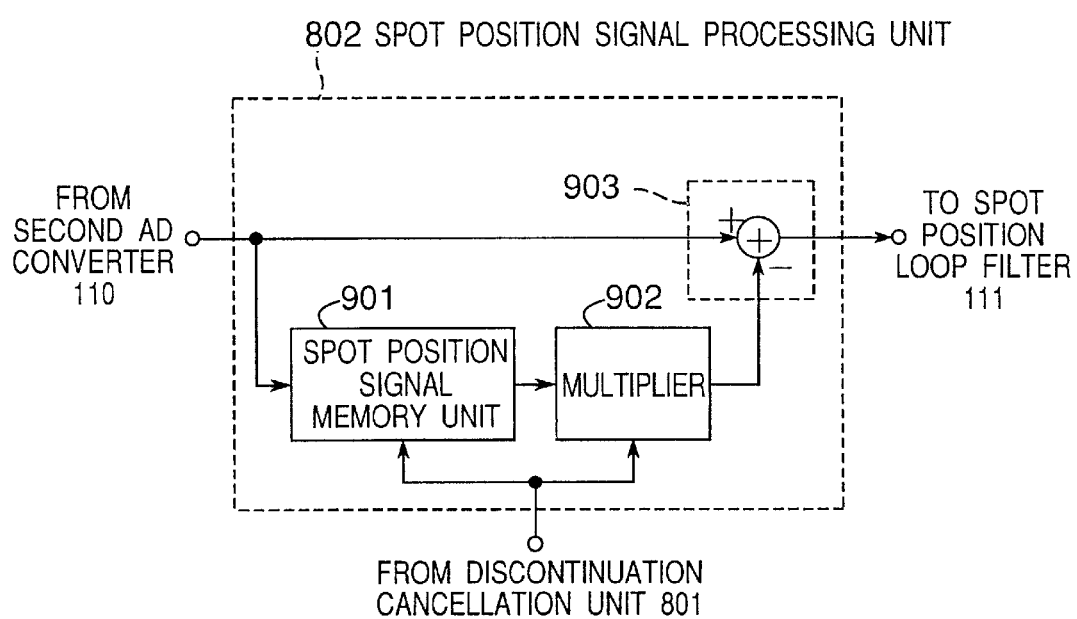
FIG. 9 is a block diagram of the configuration of a discontinuation cancellation unit 801 in the third embodiment aspect.

FIG. 9 is a detailed block diagram of the spot position signal processing unit 802. Item 901 is a spot position memory unit for storing input spot position signals. Item 902 is a multiplier that performs multiplication operations on the spot position signals stored by the spot position memory unit 901 and outputs the results. And item 903 is a subtractor that subtracts the output of the multiplier 902 from the spot position signal output by the second AD converter 110 and outputs the results.

In FIG. 9, the spot position memory unit 901, multiplier 902, and subtractor 903 correspond, respectively, to spot position memory means, processing means, and spot position servo target setting means.

Figure 10:
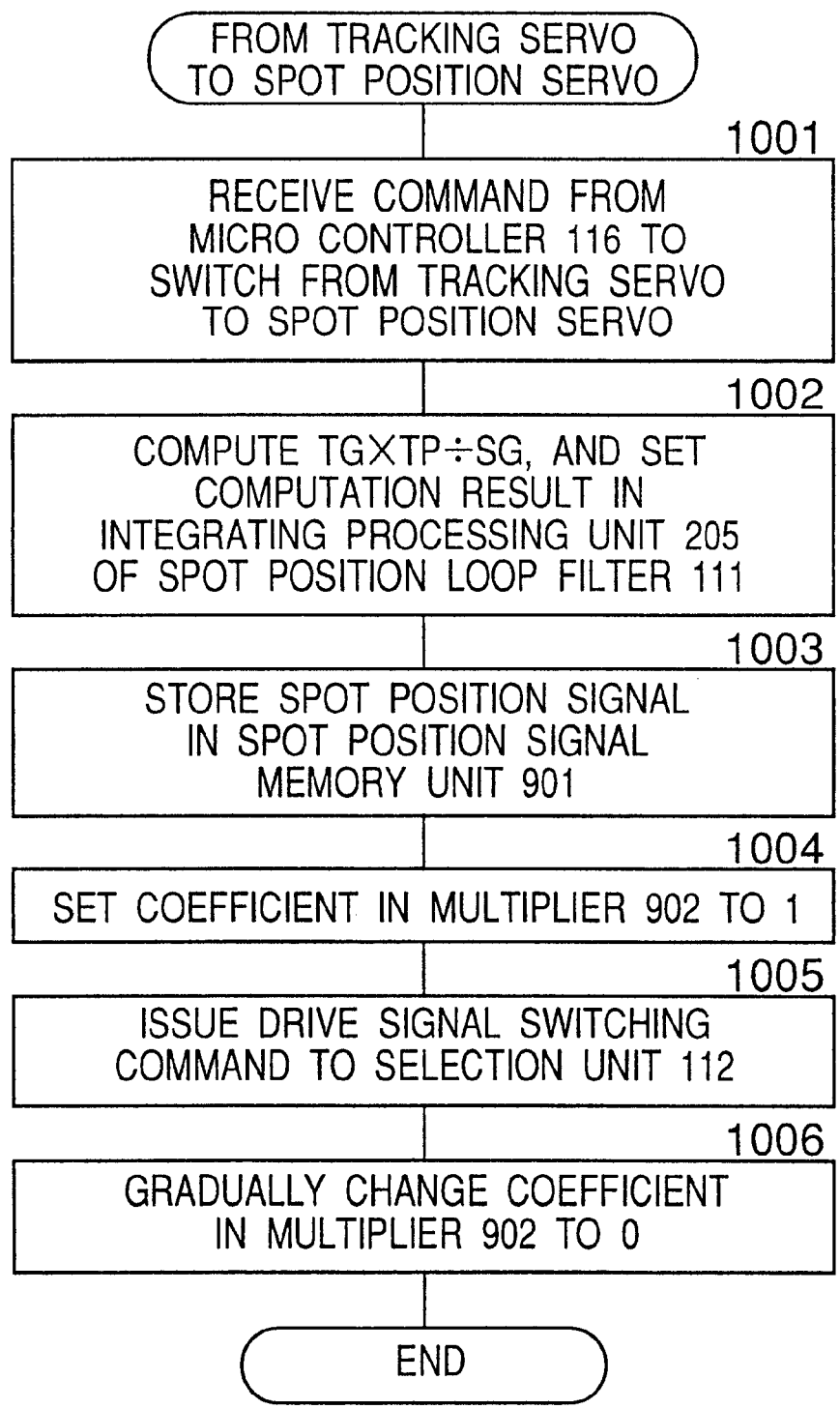
FIG. 10 is a flowchart relating to processing of the discontinuation cancellation unit in the third embodiment aspect.

FIG. 10 is a flowchart indicating processing performed by the discontinuation cancellation unit 801 when switching from the tracking servo to the spot position servo.

Figure 11:
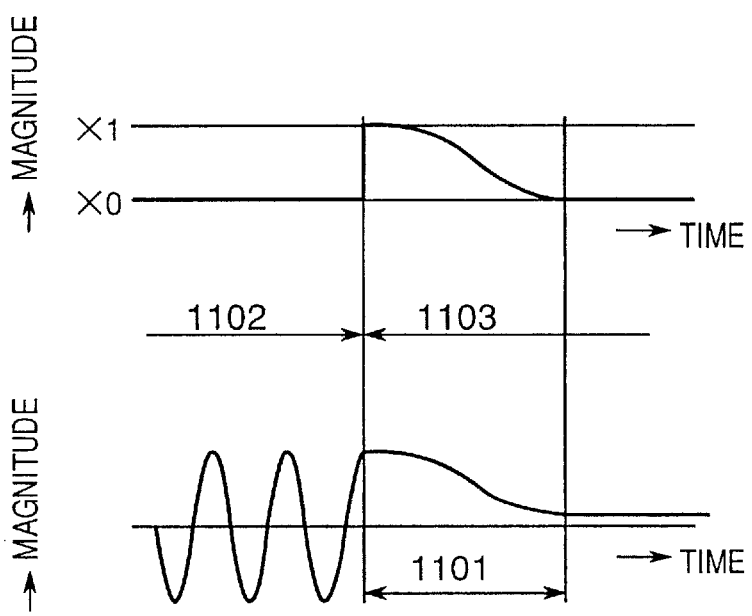
FIG. 11 is a waveform diagram representing the low-frequency component of a drive signal supplied to a tracking actuator and a signal output by a processing unit in the third embodiment aspect.
Figure 12:
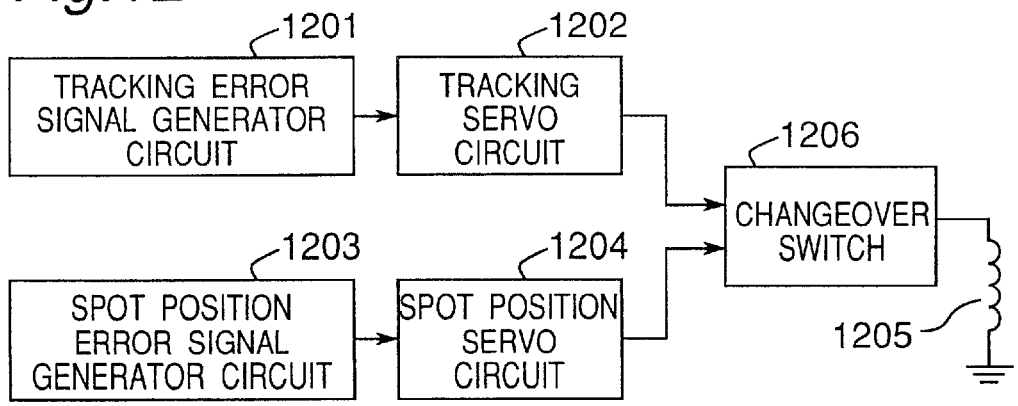
FIG. 12 is a block diagram of the configuration of a conventional optical disc device.
Figure 13:
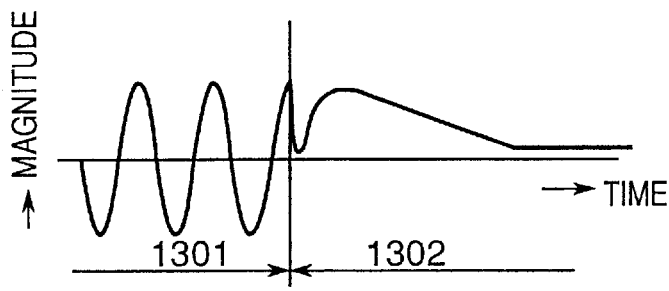
FIG. 13 is a waveform diagram representing the low-frequency component of a drive signal supplied to a tracking actuator in a conventional optical disc device.

FIG. 11 is a diagram representing an example of changes in a signal when switching from the tracking servo to the spot position servo. More particularly, the coefficient for the multiplier 902 is plotted in FIG. 11(A), and the low-frequency component of the drive sign supplied to the tracking actuator 104 is shown in FIG. 11(B). Item 1101 is the time period during which the multiplier 902 is changing the coefficient, 1102 the time period during which the tracking servo is implemented, and 1103 the time period during which the spot position servo is implemented.

The third embodiment aspect is now described using FIGS. 8, 9, 10, and 11. First, the case is described wherein the tracking servo is implemented. The tracking servo is implemented by the tracking loop filter 108 side being selected by the selection unit 112. A tracking error signal generated from the output of the light receiving element 105 by the tracking error signal generation circuit 106 is analog-to-digital converted by the first AD converter 107 and input to the tracking loop filter 108. The tracking loop filter 108 subjects the input signal to phase compensation processing and generates a tracking drive signal. The selection unit 112 sends the output from the tracking loop filter 108 side via the DA converter 113 and amplifier circuit 114 to the tracking actuator 104. The tracking actuator 104, following that input signal, moves the objective lens 103 so that the light spot follows an information track on the optical disc 101.

Next, the operations when switching from the tracking servo to the spot position servo are described. When the micro controller 116 sends a command to switch from the tracking servo to the spot position servo to the discontinuation cancellation unit 801, the discontinuation cancellation unit 801 performs the processing routines indicated in FIG. 10. When the switching command noted above is received from the micro controller 116 (1001), the value (TG× TP÷SG) found by formula (1) given earlier, according to the same procedures as in the first embodiment aspect, is stored in the integral value of the integrating processing unit 205 of the spot position loop filter 111 (1002). As a result of this processing, no step difference will develop in the low-frequency component of the signals driving the tracking actuator 104 during servo switching, as was discussed when describing the first embodiment aspect.

In this embodiment aspect, furthermore, as a result of operating the spot position signal processing unit 802, the operations in the transition state until the spot position servo stabilizes are stabilized. How that stabilization is effected is described herebelow.

First, the spot position signal at the point in time when the spot position servo is started is stored in the spot position memory unit 901 (1003). Then the coefficient in the multiplier 902 is set to 1 (1004). Accordingly, in the subtractor 903, the subtraction (spot position signal)−(spot position signal)×1=0 is performed, whereupon the output becomes 0. Here, in the spot position loop filter 111, because the input from the spot position signal processing unit 802 is 0, the value stored in the integral value of the integrating processing unit 205 in step 1002 is sent as is to the proportion processing unit 206, and the operation (TG×TP÷SG)×SG=(TG×TP)

is performed. The value resulting from this operation is the tracking drive signal low-frequency component itself. Then, when the selection unit 112 is switched to the spot position loop filter 111 side (1005), the value resulting from the operation noted above is passed to the tracking actuator 104, wherefore switching wherein there is no step difference is performed. That is, the tracking drive signal (TG×TP)

immediately prior to switching that was used in the tracking loop filter 108 is used as the spot position drive signal (TG×TP) immediately after switching, wherefore switching wherein there is no step difference is performed.

Next, in step 1006, the coefficient of the multiplier 902 is gradually changed from 1 to 0 (cf. FIG. 11(A)). Following this change, the low-frequency component of the drive signal of the tracking actuator 104 changes smoothly to a value dependent on the spot position signal (cf. FIG. 11 (B)). When the coefficient of the multiplier 902 is gradually changed from 1 to 0, and changed so as to describe an S curve as shown in FIG. 11(A), smoother switching can be effected.

Here, the output of the multiplier 902 can be said to be that which determines the point where the error signal, as seen from the spot position loop filter 111, becomes zero, that is, the value that becomes the target of the servo. In this embodiment aspect, one characteristic is that the initial value of the target of the spot position servo is made the position of the spot at the time the spot position servo starts, and, after that, the target is shifted toward the center portion of the light receiving element 105 that is the original target of the spot position servo.

In particular, when fast access that causes the head 102 to move by exactly a desired number of tracks is started, it is preferable that the coefficient of the multiplier 902 be varied in an S curve as shown in FIG. 11(A). Because the inertia of the optical head 102 will generally be large, it will take more time to get it moving than it will to move the objective lens 103. In order to accurately count the number of tracks crossed by the movement of the optical head 102, it is necessary to fix the objective lens 103 relative to the optical head 102, and not to allow track crossing by the movement of the objective lens 103, until the speed of the optical head 102 has risen to some level or above. By causing the objective lens 103 to move at a speed that is slower than the relative speed of the optical head 102 relative to the tracks, at a point in time when the speed of movement of the optical head 102 has become sufficiently fast, it becomes possible to accurately count the number of tracks crossed by the movement of the optical head 102.

As described in the foregoing, with the third embodiment aspect, when transitioning from the tracking servo to the spot position servo, by storing the spot position signal, and subtracting that spot position signal from the current spot position signal output by the second AD converter 110, the target position of the spot position servo is made the spot position at the time of transition, and, by gradually moving that target position toward the center of the light receiving element 105, sudden movements of the objective lens 103 can be prevented, and the access precision of the fast access process can be improved. With the third embodiment aspect, moreover, as compared to the second embodiment aspect, fast movement of the objective lens 103 can be prevented with the gain of the spot position servo still raised to the optimum state, wherefore increases in the residual error of the spot position servo can be prevented.

Another major characteristic of the method of computing by the processing unit 902 is that it is therewith possible to implement an innovative measure such as is described in the foregoing, for example, wherein a change is made slow at first and then fast from some later point in time.

In the description thus far, the tracking error signal and spot position signal are analog-to-digital converted and then subjected to various kinds of processes, but some or all of these operations may be performed by analog circuitry.

In the description thus far, moreover, a tracking actuator 104 that moves the objective lens 103 is used as the light spot moving arrangement, but some other method may be used instead, such as using a galvanometer to alter the position of the light spot, for example.

In the first embodiment aspect, furthermore, the low-frequency component of a loop filter used prior to switching is multiplied by the ratio between two loop filters, and the result set as the low-frequency component of the loop filter after switching, but this may be any process whatever so long as it results in no step difference appearing in the tracking actuator drive signal in conjunction with switching.

INDUSTRIAL APPLICABILITY

As described in the foregoing, the optical disc device of the present invention, by comprising discontinuation cancellation means for canceling the step differences that develop in the low-frequency component of the drive signals going to the light spot movement arrangement when switching between a tracking servo and a spot position servo, it is possible to perform the switching between the tracking servo and the spot position servo smoothly. This leads to improvement of the access precision in fast access, and to stabilization of the action when the tracking servo is lead in when gravitational forces act on the objective lens and the optical head is deflected to one side. Hence the practical benefits are very great.

What is claimed is:

1. An optical disc device, comprising:

an optical head comprising a light spot mover configured to cause a first light spot of a light beam directed onto an optical disc to move in a radial direction of the optical disc;

a tracking error signal generator that generates a tracking error signal indicating relative positions of said first light spot and information tracks on the optical disc;

a spot position signal generator that generates a spot position signal indicating a position of said first light spot in a radial direction on a light receiving element in said optical head;

a tracking servo signal generator that generates a tracking drive signal for driving said light spot mover so that said first light spot follows said information tracks, based on said tracking error signal;

a spot position servo signal generator that generates a spot position drive signal for driving said light spot mover so that a position of a second light spot of the light beam on said optical head is fixed, based on said spot position signal;

a selector that selects one of said tracking drive signal and said spot position drive signal and supplies the selected drive signal to said light spot mover; and a discontinuation cancellation unit that implements processing, when switching between said tracking drive signal and said spot position drive signal, so that low-frequency components of said selected drive signal before switching and of said selected drive signal after switching do not become discontinuous, wherein said discontinuation cancellation unit diminishes a gain in said spot position servo signal generator, for a predetermined time period, when said selector switches said selected drive signal from said tracking drive signal to said spot position drive signal.

2. The optical disc device according to claim 1, wherein said discontinuation cancellation unit performs at least one of a first process for setting an initial value in said spot position servo signal generator based on a low-frequency component of said tracking drive signal, when said selector switches said selected drive signal from said tracking drive signal to said spot position drive signal, and a second process for setting an initial value in said tracking servo signal generator based on a low-frequency component of said spot position drive signal, when said selector switches from said spot position drive signal to said tracking drive signal.

3. The optical disc device according to claim 1, wherein said discontinuation cancellation unit comprises:
- a spot position signal memory that stores spot position signals;
- a processor that processes spot position signals stored by said spot position signal memory; and a spot position servo target signal generator that sets servo targets for said spot position servo signal generator;
- wherein, when said selector switches said selected drive signal from said tracking drive signal to said spot position drive signal, said spot position signal is stored by said spot position signal memory; and an output of said processor is made a servo target set by said spot position servo target signal generator.

4. An optical disc device, comprising:
- an optical head comprising a light spot mover configured to cause a first light spot of a light beam directed onto an optical disc to move in a radial direction of the optical disc;
- a tracking error signal generator that generates a tracking error signal indicating relative positions of said first light spot and information tracks on the optical disc;
- a spot position signal generator that generates a spot position signal indicating a position of said first light spot in a radial direction on a light receiving element in said optical head;
- a tracking servo signal generator that generates a tracking drive signal for driving said light spot mover so that said first light spot follows said information tracks, based on said tracking error signal;
- a spot position servo signal generator that generates a spot position drive signal for driving said light spot mover so that a position of a second light spot of the light beam on said optical head is fixed, based on said spot position signal;
- a selector that selects one of said tracking drive signal and said spot position drive signal and supplies the selected drive signal to said light spot mover; and
- a discontinuation cancellation unit that implements processing, when switching between said tracking drive signal and said spot position drive signal, so that low-frequency components of said selected drive signal before switching and of said selected drive signal after switching do not become discontinuous,
- wherein said discontinuation cancellation unit diminishes a gain in said tracking servo signal generator, for a predetermined time period, when said selector switches said selected drive signal from said spot position drive signal to said tracking drive signal.

5. The optical disc device according to claim 4, wherein said discontinuation cancellation unit performs at least one of a first process for setting an initial value in said spot position servo signal generator based on a low-frequency component of said tracking drive signal, when said selector switches said selected drive signal from said tracking drive signal to said spot position drive signal, and a second process for setting an initial value in said tracking servo signal generator based on a low-frequency component of said spot position drive signal, when said selector switches from said spot position drive signal to said tracking drive signal.

6. An optical disc device, comprising:
- an optical head comprising a light spot mover configured to cause a first light spot of a light beam directed onto an optical disc to move in a radial direction of the optical disc;
- a tracking error signal generator that generates a tracking error signal indicating relative positions of said first light spot and information tracks on the optical disc;
- a spot position signal generator that generates a spot position signal indicating a position of said first light spot in a radial direction on a light receiving element in said optical head;
- a tracking servo signal generator that generates a tracking drive signal for driving said light spot mover so that said first light spot follows said information tracks, based on said tracking error signal;
- a spot position servo signal generator that generates a spot position drive signal for driving said light spot mover so that a position of a second light spot of the light beam on said optical head is fixed, based on said spot position signal;
- a selector that selects one of said tracking drive signal and said spot position drive signal and supplies the selected drive signal to said light spot mover; and
- a discontinuation cancellation unit that implements processing, when switching between said tracking drive signal and said spot position drive signal, so that low-frequency components of said selected drive signal before switching and of said selected drive signal after switching do not become discontinuous,
- wherein said discontinuation cancellation unit diminishes a gain in said spot position servo signal generator, until said spot position signal declines to a predetermined value, when said selector switches said selected drive signal from said tracking drive signal to said spot position drive signal.

7. The optical disc device according to claim 6, wherein said discontinuation cancellation unit performs at least one of a first process for setting an initial value in said spot position servo signal generator based on a low-frequency component of said tracking drive signal, when said selector switches said selected drive signal from said tracking drive signal to said spot position drive signal, and a second process for setting an initial value in said tracking servo signal generator based on a low-frequency component of said spot position drive signal, when said selector switches from said spot position drive signal to said tracking drive signal.

8. An optical disc device, comprising:
- an optical head comprising a light spot mover configured to cause a first light spot of a light beam directed onto an optical disc to move in a radial direction of the optical disc;
- a tracking error signal generator that generates a tracking error signal indicating relative positions of said first light spot and information tracks on the optical disc;
- a spot position signal generator that generates a spot position signal indicating a position of said first light spot in a radial direction on a light receiving element in said optical head;
- a tracking servo signal generator that generates a tracking drive signal for driving said light spot mover so that said first light spot follows said information tracks, based on said tracking error signal;

a spot position servo signal generator that generates a spot position drive signal for driving said light spot mover so that a position of a second light spot of the light beam on said optical head is fixed, based on said spot position signal;

a selector that selects one of said tracking drive signal and said spot position drive signal and supplies the selected drive signal to said light spot mover; and a discontinuation cancellation unit that implements processing, when switching between said tracking drive signal and said spot position drive signal, so that low-frequency components of said selected drive signal before switching and of said selected drive signal after switching do not become discontinuous, wherein said discontinuation cancellation unit diminishes a gain in said tracking servo signal generator, until said tracking error signal declines to a predetermined value, when said selector switches said selected drive signal from said spot position drive signal to said tracking drive signal.

9. The optical disc device according to claim 8, wherein said discontinuation cancellation unit performs at least one of a first process for setting an initial value in said spot position servo signal generator based on a low-frequency component of said tracking drive signal, when said selector switches said selected drive signal from said tracking drive signal to said spot position drive signal, and a second process for setting an initial value in said tracking servo signal generator based on a low-frequency component of said spot position drive signal, when said selector switches from said spot position drive signal to said tracking drive signal.

10. An optical disc device, comprising:

an optical head comprising a light spot mover configured to cause a first light spot of a light beam directed onto an optical disc to move in a radial direction of the optical disc;

a tracking error signal generator that generates a tracking error signal indicating relative positions of said first light spot and information tracks on the optical disc;

a spot position signal generator that generates a spot position signal indicating a position of said first light spot in a radial direction on a light receiving element in said optical head;

a tracking servo signal generator that generates a tracking drive signal for driving said light spot mover so that said first light spot follows said information tracks, based on said tracking error signal;

a spot position servo signal generator that generates a spot position drive signal for driving said light spot mover so that a position of a second light spot of the light beam on said optical head is fixed, based on said spot position signal;

a selector that selects one of said tracking drive signal and said spot position drive signal and supplies the selected drive signal to said light spot mover; and a discontinuation cancellation unit that implements processing, when switching between said tracking drive signal and said spot position drive signal, so that low-frequency components of said selected drive signal before switching and of said selected drive signal after switching do not become discontinuous, wherein said tracking servo signal generator includes a tracking error signal extractor that extracts a low-frequency component of said tracking error signal, and said spot position servo signal generator includes a spot position signal extractor that extracts a low-frequency component of said spot position signal, and wherein said discontinuation cancellation unit, when switching between said tracking drive signal and said spot position signal, controls the low-frequency component of said selected drive signal after switching so that the low-frequency component of said selected drive signal after switching becomes equal to the low-frequency component of said selected drive signal before switching.

* * * * *